US008407463B2

(12) United States Patent  (10) Patent No.: US 8,407,463 B2
Ghirardi  (45) Date of Patent: Mar. 26, 2013

(54) METHOD OF AUTHENTICATION OF USERS IN DATA PROCESSING SYSTEMS

(75) Inventor: Maurizio Ghirardi, Turin (IT)

(73) Assignee: Telecom Italia S.p.A., Milan (IT)

( * ) Notice: Subject to any disclaimer, the term of this patent is extended or adjusted under 35 U.S.C. 154(b) by 186 days.

(21) Appl. No.: 12/740,966

(22) PCT Filed: Oct. 30, 2007

(86) PCT No.: PCT/IB2007/003283
§ 371 (c)(1),
(2), (4) Date: Jul. 12, 2010

(87) PCT Pub. No.: WO2009/056897
PCT Pub. Date: May 7, 2009

(65) Prior Publication Data
US 2010/0275010 A1   Oct. 28, 2010

(51) Int. Cl.
*G06C 21/00* (2006.01)
(52) U.S. Cl. .................................................. 713/155
(58) Field of Classification Search .................. 713/155, 713/153
See application file for complete search history.

(56) References Cited

U.S. PATENT DOCUMENTS 7,536,359 B1 * 5/2009 Aiello et al. ..................... 705/67
2004/0148510 A1   7/2004 Muller et al.
2005/0248543 A1 * 11/2005 North et al. ..................... 345/173
2006/0123243 A1 * 6/2006 Shimosato et al. ........... 713/186

FOREIGN PATENT DOCUMENTS

| EP | 1255178 A1 | 11/2002 |
| EP | 1713230 A1 | 10/2006 |
| WO | 87/03977 A1 | 7/1987 |
| WO | 2005/116909 A1 | 12/2005 |

OTHER PUBLICATIONS

International Search Report and Written Opinion dtd Sep. 23, 2008, PCT/IB2007/003283.
Mizuno, S., et al., "Authentication Using Multiple Communication Channels," Proc. of the 2005 Workshop on Digital Identity Management, Nov. 11, 2005, Fairfax, VA (USA), pp. 54-62.
McCune, J., et al., "Seeing-Is-Believing: Using Camera Phones for Human-Verifiable Authentication," Security and Privacy, 2005 IEEE Symposium on Oakland, CA, USA, May 8-11, 2005, Piscataway, NJ (USA), pp. 110-124.

* cited by examiner

*Primary Examiner* — Brandon Hoffman
*Assistant Examiner* — Anthony Brown
(74) *Attorney, Agent, or Firm* — Banner & Witcoff, Ltd.

(57) ABSTRACT

A method of authentication of users in a data processing system is provided. The method includes a "Challenge" univocally associated with a user to be authenticated; processing the "Challenge" to generate an expected answer code, to be compared with an answer code that the user has to provide for authentication; encoding the generated "Challenge" for obtaining an image displayable through a display device; sending the image containing the "Challenge" to the user; displaying the image containing the "Challenge"; through a user device provided with an image-capturing device, optically capturing the displayed image; through the user device, processing the captured image for extracting from the captured image the "Challenge", and subsequently processing the obtained "Challenge" for generating the answer code; receiving the answer code from the user and comparing it to the expected answer code; and, in case of positive comparison, authenticating the user. One among the actions of generating a "Challenge" and an expected answer code, and the action of processing the captured image that generates the answer code exploit secret information univocally associated with the user.

19 Claims, 9 Drawing Sheets

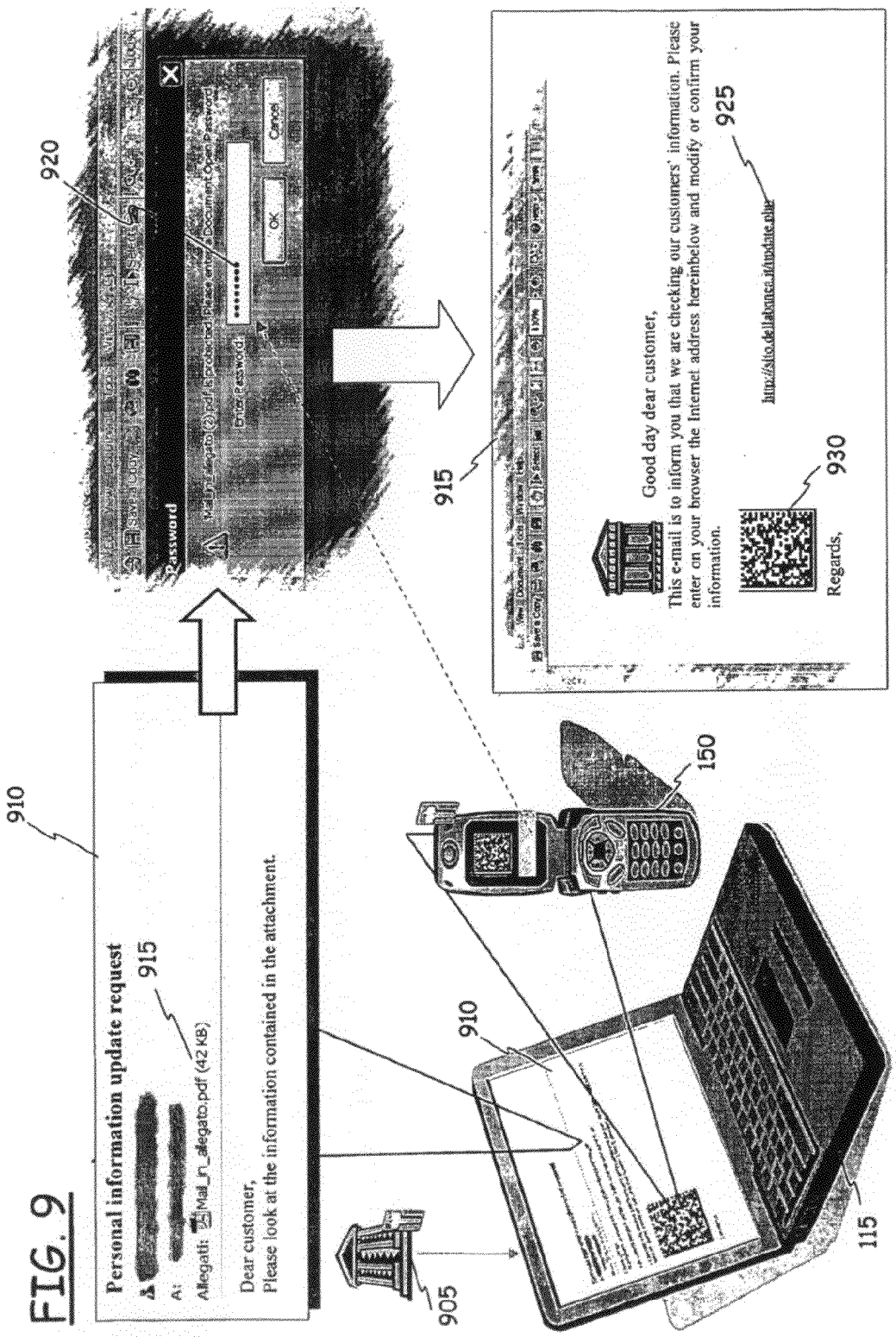

METHOD OF AUTHENTICATION OF USERS IN DATA PROCESSING SYSTEMS

CROSS REFERENCE TO RELATED APPLICATIONS

This is a U.S. National Phase Application under 35 U.S.C. §371 of International Application No. PCT/IB2007/003283, filed Oct. 30, 2007, which was published Under PCT Article 21(2), the entire contents of which are incorporated herein by reference.

BACKGROUND OF THE INVENTION

The present invention relates in general to the field of data processing systems, or computer systems, and of data networks. The invention more particularly relates to methods and systems for the authentication of users in data processing systems and data networks.

DESCRIPTION OF THE RELATED ART

With the term "authentication" the process is generally intended through which two or more separate entities, for instance a "client" data processing unit and a "server" data processing unit in a "client-server" system, can mutually verify their identity.

Several methods of authentication of a user at a computer system are known, that provide for assessing the identity of the user exploiting for instance one or more among the following verify methodologies:
- something that the user is (for instance exploiting biometric data like the fingerprints, the vocal imprint, the retinal model, the DNA sequence or the calligraphy or other biometric identifiers of the user);
- something that the user has or possesses (for instance, an identification card or a hardware device—"token"—, for example a hardware key or a "smart card" to be coupled to his/her own computer, possibly through a suitable reader device);
- something that the user knows (for instance a password, a keyword and/or a "PIN"—Personal Identification Number—or a "user-name").

In the past, for the authentication of a user this last paradigm was mainly exploited: the user, to be authenticated at data processing system, had to furnish a combination of user-name and password.

Nowadays the issue of the authentication of a user is even more felt than before, in consequence of the continuous increase of services made available on-line through data networks (for instance, banking services, services of trading of stocks or bonds, electronic messaging services—"e-mail"—, "Really Simple Syndication"—RSS—services, newsgroups, etc.), enjoyable by a user through a computer network (Internet, company intranet and "extranet"), and, recently, also entertainment services that involve the distribution subjected to payment of contents based on the DTT (Digital Terrestrial Television) and IPTV (Internet Protocol TeleVision) technologies.

Mechanisms of authentication have thus been developed that are safer and stronger in comparison to the normal mechanism based on user-name/password, such as for instance the solutions based on biometric detection or those based on hardware tokens or smart cards, accompanied by specific software ("One Time Password"—OTP—, digital certificates and the like).

In "Authentication Using Multiple Communication Channels" by Shintaro Mizuno, Kohji Yamada, Kenji Takahashi, NTT Information Platform Sharing Laboratories, Proceedings of the 2005 workshops on Digital identity management, 2005, Fairfax, Va., USA, Nov. 11-11, 2005, pages 54-62, a "challenge-response" authentication mechanism is described that makes use of a bidimensional barcode. The service provider site sends to a computer of the user, connected over the Internet, a barcode that includes a "challenge"; using a cellular telephone, the user reads the bidimensional barcode displayed on the screen of the computer; using again the cellular telephone, the "challenge" is sent, over a cellular telephony network, to the service provider, through an authentication server, and it is then re-sent to the cellular telephone with a signature of the service provider.

In J. M. McCune et al., "Seeing-Is-Believing: Using Chamber Phones for Human-Verifiable Authentication", Proceedings of the 2005 IEEE Symposium on Security and Privacy, May 8-11, 2005, The Claremont Resort, Oakland, Calif., USA, pages 110-124, a system is presented that uses bidimensional barcodes and cellular phones with camera to implement a visual identification channel; the cellular phone has to be able to use the integrated camera to recognize bidimensional barcodes. The method uses the bidimensional barcodes to transfer on a mobile device a hash that will serve to verify an authentication key exchanged in other way (infrared communication, bluetooth) to establish a secure connection with a TCG-compliant application (where TCG stands for Trusted Computing Group, an organization that promotes open standards to strengthen the data processing platforms against software attacks).

SUMMARY OF THE INVENTION

The Applicant has observed that the above described technologies are rather complex and their cost can exponentially grow with respect to the degree of safety and reliability that they are asked to offer.

For instance, in the solutions based on the use of hardware tokens, an extremely precise clock is present on the server that is able to "synchronize" with that of the device possessed by the user; discordances in the synchronization make both the user device and the authentication process unusable.

The technique described in the article of Mizuno et al. has the problem of needing a connection to a mobile telephony network, something that is not always possible.

The method described in the article of McCune et al. is not used for authenticating the user, but rather applications or devices with which it is intended to establish a data connection, and it uses some form of radio or wired communication. The security is only linked to the possession of the terminal.

The Applicant has therefore observed that there is the need of making available a new methodology of authentication of the user, having a high degree of security and a lower implementation cost compared to the currently available solutions.

The Applicant has found a methodology that is secure and, at the same time, has a low implementation cost; such methodology exploits a mechanism of authentication of the type "Challenge-Response".

For the purposes of the present invention, by "Challenge-Response" mechanism it is intended a mechanism such that a subject/entity that desires to authenticate at another entity, and the authenticator entity prove to share capabilities based on data processing methodologies (for instance, encryption/decryption capabilities, hashing capabilities, encoding/decoding capabilities) or information (for instance, username, PIN, encryption or hashing keys) that allow the mutual recognition; such "Challenge-Reponses" mechanisms are for instance exploited in the CHAP (Challenge Handshake Authentication Protocol) or Kerberos protocols, or in the authentication in mobile telephony networks of second and third generation. Particularly, for the purposes of the present invention, by "Challenge" it is intended information sent to the subject that has to be authenticated, that is univocally correlated to the subject to be authenticated, and that the subject to be authenticated exploits for showing to possess a determined ability, generating the correct "Response" expected by the authenticator entity.

Particularly, the dispatch to the user of the authentication "Challenge" by the data processing system, e.g. an authentication server, at which the user desires to authenticate is for instance made in graphic form, for example in form of bidimensional barcode. The content of the graphic "Challenge" sent to the user can, if desired, be protected using encryption techniques and/or techniques of information authentication.

To generate the "Response" to be returned to the authentication server, the user uses a device with image capturing capabilities which is distinct from the computer through which the user has to input the information necessary to his/her authentication. For instance, such device can advantageously be a cellular telephone equipped with a camera or camcorder, a more and more diffused device nowadays, with installed a suitable software or firmware adapted to the recognition and the processing of the "Challenge" received in graphic form.

The "Response" sent by the user in answer as a result of the processing of the received "Challenge" does not contain enough information to make one able to retrieve the "Challenge" from which it has been calculated, and it cannot be used by an attacker with the purpose of interfering in the communication between the authentication server and the user or vice versa.

An advantage of the proposed solution is that, for its operation, it does not require radio coverage, particularly by a mobile telephony network, since it exploits an "optical" reading of the information. Another advantage is that it is not based on an internal clock to produce the authentication information that has to be inputted.

Preferably, the authentication information produced by the authentication server, i.e. the "Challenge" and the "Response" expected as a response from the user, have a limited temporal validity, to prevent any possible fraudulent reuse thereof.

Preferably, the authentication server can implement mechanisms adapted to disable the user after a limited number, for instance equal to three, of consecutive unsuccessful attempts of authentication.

An advantage of the proposed solution is that the management costs are reduced compared to other authentication methodologies, because existing, non-specialized devices and software solutions are used.

According to an aspect of the present invention, a method of authentication of users in data processing systems is provided. The method includes:

generating a "Challenge" univocally associated with a user to be authenticated;
processing the "Challenge" to generate an expected answer code, to be compared to an answer code that the user has to furnish for his/her authentication;
encoding the generated "Challenge" to obtain an image displayable through a display device adapted to display the image to the user;
sending the image containing the "Challenge" to the user;
displaying the image containing the "Challenge" to the user through the display device;
through a user device equipped with an image-capturing device, optically capturing the displayed image;
through the user device, processing the captured image for extracting from the captured image the "Challenge", and subsequently processing the obtained "Challenge" to generate the answer code;
receiving the answer code from the user and comparing it to the expected answer code; and
in case of positive comparison, authenticating the user,
wherein one among said actions of generating the "Challenge" and the expected answer code, and said action of processing the captured image that generates said answer code exploit a secret information univocally associated with the user.

Said generating an expected answer code can include associating with the expected answer code a time validity limit, and said receiving the answer code from the user and comparing it to the expected answer code includes assessing if the answer code from the user is received within said time validity limit.

Said generating the "Challenge" can include generating a substantially random sequence of bits.

Said generating the "Challenge" can moreover include encoding the substantially random sequence of bits into a first string of alphanumeric characters that univocally represents it.

Said encoding the "Challenge" can also include encoding the first string of alphanumeric characters, and encoding the encoded first string of alphanumeric characters to obtain the image displayable through the display device.

Said generating the expected answer code can include encrypting the substantially random sequence of bits with said secret information or calculating a hash of the substantially random sequence of bits with said secret information.

Said generating the expected answer code can also include encoding the encrypted substantially random sequence of bits, or the hash of the substantially random sequence of bits, to obtain a second string of alphanumeric characters and storing the obtained string.

Said processing the captured image for extracting from the captured image the "Challenge" and generating the answer code can in particular include:

decoding the first string of alphanumeric characters to obtain the substantially random sequence of bits;
encrypting the substantially random sequence of bits with said secret information to obtain a further encrypted substantially random sequence of bit, or calculating a hash of the substantially random sequence of bits with said secret information;
encoding the further encrypted substantially random sequence of bits, or the hash of the substantially random sequence of bits, to obtain the second string of alphanumeric characters, said second string of alphanumeric characters constituting the answer code.

Said generating the "Challenge" may comprise encrypting the substantially random sequence of bits with said secret information, and possibly encoding the encrypted substantially random sequence of bits into a first string of alphanumeric characters, and encoding the first string of alphanumeric characters to obtain the image displayable through the display device.

Said generating the expected answer code can include encoding the substantially random sequence of bits into a second string of alphanumeric characters and storing the obtained second string.

Said processing the captured image for extracting from the captured image the "Challenge" and generating the answer code can include:
  decoding the first string of alphanumeric characters to obtain the encrypted substantially random sequence of bits;
  decrypting the encrypted substantially random sequence of bits with said secret information to obtain the substantially random sequence of bits;
  encoding the substantially random sequence of bits to obtain the second string of alphanumeric characters, said second string of alphanumeric characters constituting the answer code.

Said encoding the generated "Challenge" to obtain an image can include generating a bidimensional barcode.

Said authenticating the user can include enable the user accessing, through a data processing terminal of the user connected to a data network, a service made available by a server connected to said network.

Said encoding the generated "Challenge" for obtaining an image can comprise including in the image summary information adapted to identify a transaction effected by the user.

Said sending the image containing the "Challenge" to the user can comprise including the image into an electronic mail message, and sending the electronic mail message to the user.

Said authenticating the user can include allowing the user to display an electronic document attached to the electronic mail message.

According to another aspect of the present invention, a system for the authentication of users in a data processing system is provided.

The system includes:
a) an authentication server, said authentication server being in use adapted to:
  generate a "Challenge" univocally associated with a user to be authenticated;
  processing the "Challenge" to generate an expected answer code, to be compared to an answer code that the user has to furnish for his/her authentication;
  encoding the generated "Challenge" for obtaining an image;
  sending the image containing the "Challenge" to a user's data processing terminal through a data network;
  wherein the user's data processing terminal comprises a display device adapted to display to the user the image containing the "Challenge";
b) a user device equipped with an image-capturing device, adapted to optically capture the displayed image, the user's device being adapted in use to process the captured image for extracting from the captured image the "Challenge" and to process the "Challenge" to generate an answer code to be compared to the expected answer code for the authentication of the user,
  wherein one among said actions of generating a "Challenge" and generating an expected answer code, and said action of processing the captured image to generate the answer code use a secret information univocally associated with the user.

BRIEF DESCRIPTION OF THE DRAWINGS

The features and the advantages of the present invention will be made apparent by the following detailed description of some possible embodiments thereof, provided merely by way of non-limitative examples, description that will be conducted making reference to the attached drawings, wherein:

FIG. 9 schematizes a process of local verification of the authenticity of the electronic mail message of FIG. 8A.

DETAILED DESCRIPTION OF SOME EMBODIMENTS OF THE INVENTION

Figure 1:
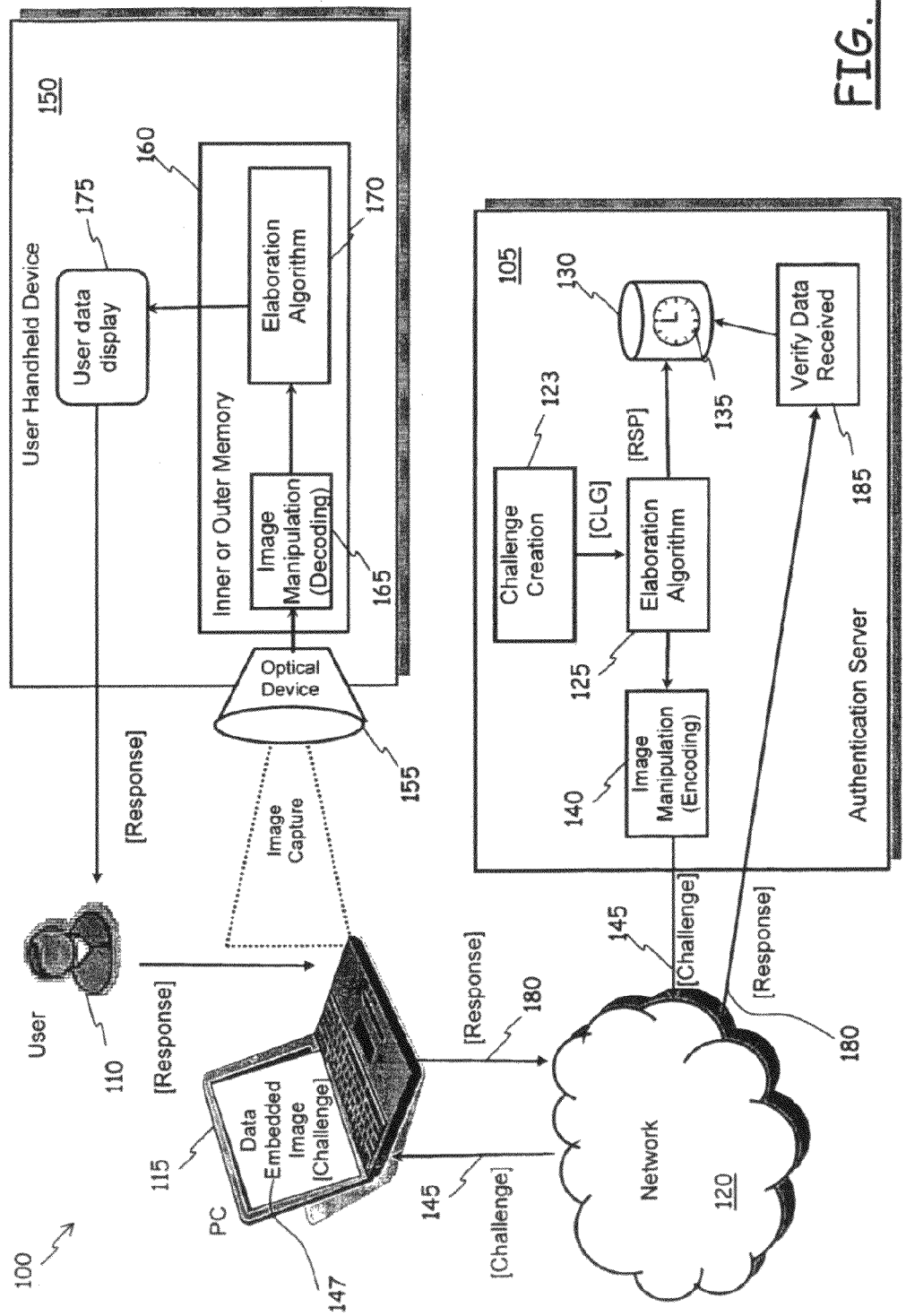
FIG. 1 schematically shows a logical model of an authentication system adapted to implement an authentication method according to an embodiment of the present invention, with represented the main constituent elements and the respective interactions.

With reference to the drawings, in FIG. 1 there is schematically shown a logical model of an authentication system 100 according to an embodiment of the present invention, with represented the main constituent elements and the respective interactions.

In the figure, reference 105 identifies an authentication server, at which the users, for instance the user denoted with the reference 110 in the figure, having a personal computer or user terminal 115 connected to a data network 120 like for instance the Internet, a company's intranet, an extranet, has to authenticate to be able to enter and enjoy the services made available by the authentication server 105 itself, or, in general, by one or more other servers (not shown in the figure), which rely on the services offered by the authentication server 105 for the authentication of their own users that request to exploit the services offered by such other servers. The user terminal 115 can be a conventional Personal Computer (PC), fixed or portable, or any other data processing device.

Each time the user 110 wants to be authenticated at the authentication server 105, the latter, after having received the authentication request from the user terminal 115 through the data network 120, sends authentication information to the terminal 115 of the user 110, through the data network 120.

The authentication information is firstly generated by the authentication server 105 by means of a generation algorithm 123, and then it is processed by a suitable processing algorithm 125; the result of the processing of the authentication information is stored on a memory support 130, for instance a file or a database on a non-volatile support, as a result expected as an answer from the user 110; preferably, a respective limited temporal validity is associated with such expected result (as schematically depicted in the figure by the clock 135 associated with the memory support 130).

Subsequently, the authentication server 105 encodes in graphic form the authentication information previously generated, by means of an image processing algorithm 140.

Authentication information 145 encoded in graphic form is thus obtained, that is sent by the authentication server 105 to the terminal 115 of the user 110, through the data network 120. Such authentication information 145 constitutes the graphic "Challenge" that will be received by the user 110 on his/her own terminal 115.

Once received by the user terminal 115, the authentication information encoded in graphic form, i.e. the graphic "Challenge", is presented to the user 110 as an image, for instance on a display device 147 like a screen or monitor of the computer 115, and/or possibly printed on a paper support by means of a printer (not shown).

The user 110 possesses a device 150, preferably a portable device like for instance a cellular phone, a "smartphone", a PDA ("Personal Digital Assistant") or similar device, equipped with an optical image-capturing device 155, for instance a digital camera or a camcorder, capable of capturing the image displayed by the user terminal 115 (or printed on the paper support), without the need of any physical contact/data link between the portable device 150 and the user terminal 115.

After having captured the image, the portable device 150, by means of a suitable software preinstalled on it and that, when executed, is at least partially loaded in a working memory 160 of the portable device 150, performs a digital processing of the captured image. Particularly, through an image processing algorithm 165, the graphic "Challenge" is extracted from the captured image and decoded. The information contained in the extracted and decoded graphic "Challenge" is then processed by a processing algorithm 170, capable of providing to the user 110, through a video and/or audio interface 175 present in the portable device 150, information, derived from the content of the processed graphic "Challenge", that the user 110 will have to return to the authentication server 105 to be authenticated.

Using the terminal 115, the user 110 communicates to the authentication server 105 the video and/or audio information provided thereto by his/her own portable device 150; such information that the user communicates to the authentication server 105 forms the "Response" 180 to the received "Challenge" 145.

The authentication server 105, having received from the user 110 the "Response" 180 through the data network 120, by means of a comparison algorithm 185 compares the information received by the user with what previously stored on the memory support 130 as expected result, analyzing in particular the temporal validity and the content of it. If the verification has positive result, the authentication server 105 communicates to the user (through the data network 120 and the terminal 115) that he/she has been "approved" and authenticated, otherwise the verification failure is preferably communicated to the user. Preferably, after a predetermined number, for instance three, of consecutive failed attempts of authentication, the user 110 is not accepted by the system anymore; the authentication server 105 can possibly disable the user 110, so as to prevent further attempts of authentication; to be re-enabled, the user will for instance have to contact a help desk.

In the following of the present description, two possible implementation modes of the authentication method presented above will be described: a first mode, that will be called "symmetrical", and a second mode, that will be called "asymmetrical". Shortly, the symmetrical mode provides that the processing algorithm 125 used by the authentication server 105 and the processing algorithm 170 used by the portable device 150 of the user 110 are substantially identical, while the asymmetrical mode provides that the two processing algorithms are different.

Symmetrical Mode

Figure 2:
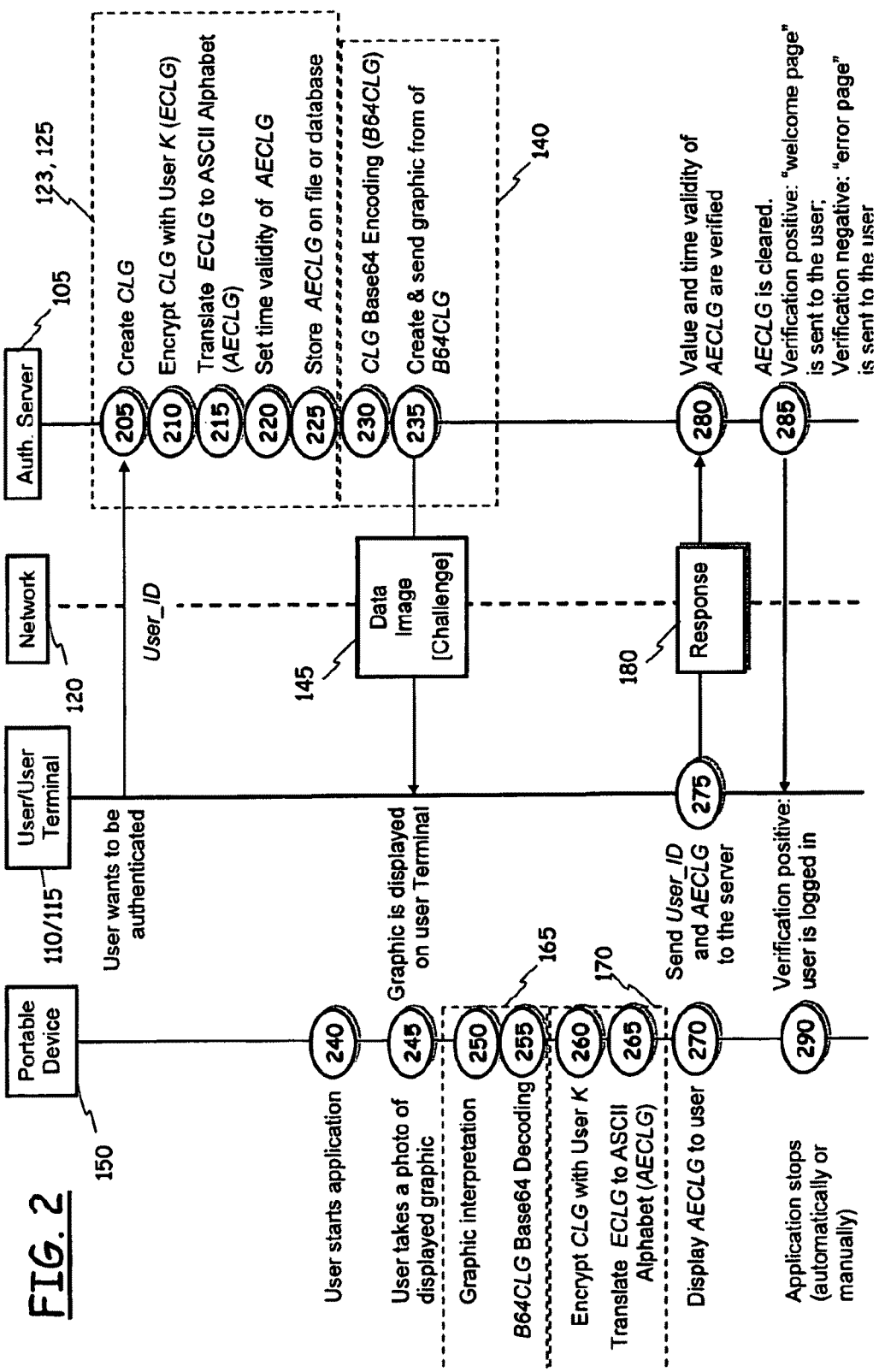
FIG. 2 schematically shows a first implementation mode of an authentication method according to an embodiment of the present invention, hereinafter also defined "symmetrical mode"

In FIG. 2 there is schematically shown, in terms of the main operations performed by the different players and of the information exchanged among them, the symmetrical mode of implementation of the authentication method according to an embodiment of the present invention.

The user 110 that desires to exploit the authentication services made available by the authentication server 105 preliminarily has to subscribe to such services. At the subscription, a profile of the user 110 is created on the authentication server 105, and univocal identification code User_ID and an encryption key K are associated therewith; the identification code User_ID and the encryption key K are then also installed on the portable device 150 of the user 110. The identification code User_ID can be configured by the user, or preferably by an administrator upon request by the user, directly on the authentication server 105. The encryption key K can be provisioned to the user in different ways and it is preferably protected through an encryption algorithm, so that for its use the user will have to enter an unblocking code known only to him/her. In particular, the encryption key K can be provisioned to the user via SMS (Short Message Service) sent to a cellular phone of the user and intercepted by software installed on the cellular phone, or the encryption key K can be integrated in an installation package provided to the user at the subscription of the service. Another possibility consists in an optical capture of the encryption key K, in a way similar to that described before for the capturing of the "Challenge" 145 (in this case, the software installed on the portable device 150 of the user has personal but provisional encryption key, to be used only the first time for the installation of the encryption key K that will subsequently be used). A further possibility provides that the encryption key K is pre-installed on the portable device 150 of the user or on the SIM (Subscriber Identity Module) provisioned to the user by an operator of a mobile telephony network. Combinations of the preceding methods are also possible: for instance, the first installation of the encryption key K can take place through dispatch of an SMS message, and if, during the time, the encryption key K need to be replaced, this can be done via optical capture, or the encryption key K, initially installed through the installation package, can subsequently be replaced via optical capture. The user can also have more than one encryption key installed, the different encryption keys being used for different authentication services (for instance, two or more of the authentication services that will be described hereinafter).

The process of authentication of the user 110 starts with an explicit authentication request submitted by the user 110, who, declaring his/her own identity to the authentication server 105, for instance using his/her own personal identification code User_ID, triggers the authentication process. In an embodiment of the present invention, the authentication process evolves as described herebelow. The various phases that will be described are identified by respective reference numerals in the drawing.

Phase 205. Using a suitable, hardware or software generator, schematically represented by the block 123 in FIG. 1, the authentication server 105 generates a "Challenge" CLG; this latter can be for instance constituted by a random sequence of bits, for instance at least 128 bits long (however, the length of the sequence forming the "Challenge" CLG is not limitative for the purposes of the present invention). The generator 123 of the "Challenge" CLG can for instance use a generation algorithm of random sequences of bits complying with the directive NIST FIPS Pub 140-2.

Phase 210. The authentication server 105 then proceeds to encrypting the "Challenge" CLG thus generated with an encryption algorithm, for instance a symmetric key algorithm, such as an algorithm complying to the standard AES (Advanced Encryption Standard), using the encryption key K associated with the user 110 identified by the personal identification code User_ID that the user 105 has provided to the authentication server with the authentication request. An encrypted random sequence of bits ECLG (Encrypted CLG) is thus obtained, for instance 128 bits long.

Phase 215. The authentication server 105, through a suitable algorithm, schematically represented by the block 125 in FIG. 1, transforms the encrypted random sequence of bits ECLG into a textual string AECLG (for instance according to the ASCII code), of predetermined length (for instance of 10 characters). Preferably, an alphabet is used such as to guarantee that the textual string AECLG thus obtained is univocally representative of the encrypted random sequence of bits ECLG, it can be entered by the user using conventional data input devices (keyboard, mouse) of which a computer is normally equipped, and it does not contain ambiguities on the characters (for instance, the textual string AECLG preferably does not at the same time contain the characters "o", "O", "0" or "i", "I", "L"). The alphabet can have any cardinality, and can contain any alphanumeric character (for instance a . . . z, A . . . Z, 0 . . . 9, !"£$ %éèàçà@ù).

Particularly, to transform a random sequence of mutually independent bits and uniformly distributed into a correspondent textual string, a decimation algorithm can be used. The obtained textual string is constituted by a succession of symbols, derived from the random sequence of bits, which also satisfy the requirement of independence and uniform distribution. Later on, an example of an algorithm will be described that, starting from such a random sequence of bit, is able to derive therefrom a textual string that is constituted of symbols belonging to a configurable alphabet (numerical or alphanumeric) and of configurable length.

Phase 220. Preferably, the authentication server 105 sets a temporal term of validity of the textual string AECLG, defined as the maximum time within the authentication server 105 waits for the user 110 to return his/her answer, that is the verification "Response" (for instance, the term of validity can be of some minutes, e.g. 2 minutes).

Phase 225. The authentication server 105 stores the string AECLG and, where provided for, the temporal term of validity associated thereto in a local file (shown schematically in FIG. 1 by the block 130), waiting for them to be compared to the "Response" received by the user.

Phase 230. The authentication server 105 then encodes the binary random sequence forming the "Challenge" CLG into characters, for instance using the Base64 format, obtaining an encoded string B64CLG. In alternative, to reduce the number of characters to be graphically encoded, it is possible to use a coding method that consists in converting the binary random sequence CLG into a sequence of Bytes, and then transforming the hexadecimal value of every Byte of the sequence into characters, according to the alphabet (0 . . . 9 to . . . F). For instance, the sequence of bits "10101010" is encoded into "AA"; in this way, a binary sequence of 128 bits is encoded into a sequence of 32 characters.

Phase 235. The authentication server 105 then uses the string B64CLG for the generation of suitable graphics, which, through the data network 120, is sent to the terminal 115 of the user 110.

Phase 240. After having sent to the authentication server 105 the authentication request, the user 110 activates on his/her own portable device 150 a suitable application, previously installed on the portable device 150 (for instance in the phase of subscription to the services offered by the authentication server 105) capable of optically capturing the graphic "Challenge" 145 received by the authentication server 105; preferably, the application is protected by a start PIN (Personal Identification Number), that allows accessing the encryption key K of the user, maintained in encrypted way on the terminal.

Phase 245. Through its graphic interface, the user terminal 115 displays on its screen to the user 110 an image containing the graphic "Challenge" 145 received; through the portable device 150, the user 110 captures the displayed graphic "Challenge", for instance taking a photograph of the image of the screen 147 of the terminal 115 on which the graphic "Challenge" is displayed. In alternative to the display on the screen 147 of the terminal 115, the printout of the image on a paper support can be foreseen.

Phase 250. A suitable application (schematically represented by the block 165 in FIG. 1) resident on the portable device 150 of the user 110 analyzes and extracts from the photographed image the string B64CLG.

Phase 255. The application 165 on the portable device 150 then converts the string B64CLG (encoded with B64 or other coding, for instance the hexadecimal coding previously described) into the binary sequence CLG.

Phase 260. The processing algorithm 170 on the portable device 150 then encrypts the binary sequence CLG using the encryption key K of the user 110 (in alternative to the encryption key resident K on the portable device 150, it is also possible to use as encryption key the PIN used to start the displaying application resident on the user terminal 115), with an algorithm identical to that used by the authentication server 105, obtaining an encrypted sequence ECLG, for instance 128 bits long.

Phase 265. The encrypted sequence ECLG thus obtained is then transformed by the processing algorithm 170 on the portable device 150 into a textual string AECLG, using the same methodology and alphabet used by the authentication server 105 and described previously.

Phase 270. The string AECLG thus obtained is displayed to the user 110 on a screen, or vocally announced through a loudspeaker of the portable device 150.

Phase 275. The user 110, using the terminal 115, for instance through the keyboard, enters the string AECLG communicated thereto by the portable device 150, and the entered string AECLG is communicated through the data network 120 to the authentication server 105 together with the personal identification code User-ID of the user. In alternative to the use of the keyboard, the user 110 can use the mouse of his/her terminal 115, or it is possible to exploit a direct communication among the portable device 150 and the user terminal 115, for instance exploiting BlueTooth or NFC (Near Field Communication) technology.

Phase 280. The authentication server 105, after receiving from the user terminal 115 the string AECLG, forming the "Response" 180, and using as a reference the personal identification code User-ID of the user 110, through the algorithm 185 ascertains:
- whether the user identified by the personal identification code User-ID had previously requested to be authenticated;
- the temporal validity of the answer from the user 110, in other words whether the answer arrived within the time interval set by the authentication server 105 upon generating the "Challenge"; and
- the correctness of the string AECLG received from the user 110, by comparison with the value previously stored in association with that personal identification code User-ID.

Phase 285. If the result of the above checks is positive, the authentication server 105 can for instance:
- remove the value AECLG stored in the memory support 130, to prevent any subsequent attempt of reusing the same "Challenge"; and
- send or redirect the user 110 to a "welcome page", to evidence the occurred authentication of the user 110.

In case one or more of the above checks did not have positive result, the authentication server 105 can for instance:
- remove the value AECLG stored in the memory support 130, to prevent any subsequent attempt of reusing the same "Challenge"; and
- send or redirect the user to an "error page" that invites him/her to repeat the authentication process from the beginning.

At each authentication attempt failed, the authentication server can increase a failures counter; at the third consecutive failure, the user 110 can be disabled by the authentication server 105; once disabled, the user 110 cannot start the authentication process anymore (without being preliminarily re-enabled by the authentication server).

Phase 290. The application resident on the portable device 150 can automatically terminate, after the lapse of a predetermined time interval, for instance one minute, from having communicated to the user the value to be returned to the authentication server 105. The user 110 may also immediately terminate such application manually, possibly after having been redirected to the "welcome page."

Herebelow an example is described of an algorithm that, starting from a sequence of bits, particularly a random sequence, is able to derive therefrom a textual string that is constituted by symbols belonging to a configurable alphabet (numerical or alphanumeric) and of configurable length.

Let L be the length of the textual string that should be obtained, let $S=\{s0, \ldots, sM\}$ be the alphabet of the symbols that will form the string, and let $M=\|S\|$ be the cardinality of the alphabet S.

From the random sequence of bits generated by the (hardware or software) generator 123, T blocks $I_0, I_1, \ldots, I_T$ are selected, each one made up of B bits. The parameter B can be selected according to the following rule:

$$B = \begin{cases} \log_2 M & \text{if } M \text{ is a power of 2} \\ [\log_2 M] + 1 & \text{otherwise} \end{cases}$$

From each one of the T blocks of bits $I_0, I_1, \ldots, I_T$ the associated decimal digit $I_0, I_1, \ldots$, is obtained, which is used as an index to select the symbol from the alphabet S; for the generic, M-th block of bits, the associated decimal digit is $I_M$. Starting from this index, the related symbol $s_{I_m}$ is obtained, applying following rule:

$$s_{I_m} = \begin{cases} S[I_m] & \text{if } I_m < M \\ \text{otherwise next block} \end{cases}$$

This algorithm has a rate of loss of bits P equal to $P=(2^B-M)$. In case the alphabet of symbols has a cardinality equal to a power of two, that is $M=2^B$, there is no loss of bits, otherwise there will be a number P of unused bits. To reduce the number P of unused bits, the blocks of bits can be selected so as to obtain blocks of symbols or overlapping blocks.

The algorithm performs a decimation scanning the bits of every block of bits T into which the sequence of bits to be transformed into a textual string is partitioned first from the left to the right, and subsequently from the right to the left; in this way, the length in bits of each block T is virtually increased, and the rate of loss P is reduced. In case at the end of the scanning from the left to the right and from the right to left the algorithm did not converge, i.e. it was not possible to find a sequence of symbols of the desired length L, activities can be performed directed to find the remaining bits, restarting to read the bits of the generic block T from the to the right using one or both the strategies described hereinafter.

a) Calculation of the Modulus

The B bits read from the generic block T are "mapped" with respect to the selected alphabet using the rule of the modulus:

$$s_{I_m} = S[\text{mod}_M(I_m)]$$

b) Reduction of the Value of B

The number of bits read from the generic block T is reduced by one, so as to increase the probability to get a numerical value capable of indexing a symbol of the used alphabet. The calculation of B can be the following:

$$K = \begin{cases} (\log_2 M) - 1 & \text{if } M \text{ is a power of 2} \\ [\log_2 M] & \text{otherwise} \end{cases}$$

Another possible algorithm that can be used for transforming the random sequence of bit constituting the "Challenge" CLG into a textual string provides, the characteristics and the modalities of calculation of the quantities L, S, M and B described above, to obtain a sequence of characters of default length L performing only one scan of the blocks of bit, from the left to the right.

The following variables are defined:

Q=number of bits constituting the initial random sequence of bits (i.e. the "Challenge" CLG);

W=maximum number of possible attempts of mapping of the random sequence of bits into the textual string, that is W=Q/B;

Y=number of performed mapping attempts; and

Z=number of symbols of the textual string of length L remaining to be mapped.

Using the index $I_m$ calculated as previously described, the corresponding symbol $s_{I_m}$ is obtained according to the following rule:

$$s_{l_m} = \begin{cases} S[I_m] & \text{if } I_m < M \\ \text{Next } K \text{ Bits} & \text{if } Z > (W - Y) \\ S[\text{mod}_M(I_m)] & \text{if } Z \equiv (W - Y). \end{cases}$$

Concerning the encryption algorithm used by the authentication server 105 and the portable device 150 of the user 110, it can possibly be replaced by a data authentication algorithm of the HMAC (Hashed Message Authentication Code) type, with SHA-1 (Secure Hash Algorithm 1) hash mechanism type, that also generates as a result a string being a function of the encryption key K of the user 110.

As known to those skilled in the art, HMAC is a non-reversible algorithm for the authentication of messages based on a hash function. By means of HMAC it is possible to guarantee both the integrity and the authenticity of a message. The algorithm HMAC uses a combination of the original message and of a secret key for the generation of the code. A peculiarity of the HMAC algorithm is that it is not linked to a particular hash function, and this with the purpose of allowing the replacement of the used hash function in case it is discovered to be weak. In the following table, some examples of calculation that exploit HMAC type SHA1 are reported.

| Row | Data | Key | Result of the calculation of HMAC with HASH type SHA1 |
|---|---|---|---|
| 1 | 1 | 1 | 5b0c157d4e7672444c41033561554839ed1fd2d6 |
| 2 | 1 | marco | a9774f9c88cc84c691ca7aaf5cf42d4f58e20ad3 |
| 3 | 123456789 | mirco | 404b5c7716cfe6adda7c9be1a4e0611349b99fb3 |
| 4 | 123456 | mirco | caca41a07de234932f29f92e0876672f39ebdce4 |
| 5 | 123456 | marco | 73c90c08d7e5996a331fe89e3bd3d011068a9d28 |
| 6 | 789012 | marco | 5e52768fde27503da90915a2f9d8beab1a888da0 |
| 7 | 789012 | mirco | 510e7397ee2711be94f0ecc69a6675ab11d813d6 |
| 8 | Mirco | 789012 | 9e81045405f727544ad4fb38da573f96f56c6426 |

It can be appreciated that, in the considered example, the result is always a string of length equal to 40 characters, independently of the data size and of the key (rows from 1 to 8); it is also possible to note that the function always returns a different value for the same data to transfer, as the key changes (rows from 4 to 7).

In a practical implementation of the present invention, the user is preferably not asked to enter on the keyboard of his/her own terminal 115 all the 40 characters generated by the hash function, but rather a lower number of characters such that it is possible to assess the correctness of the generated hash. It has been demonstrated (see the document RFC4635) that the function MAC type SHA1 already contains characteristics of uniqueness of the information in the first 96 bits, or rather the first 12 bytes, and thus in the first 12 characters coded in ASCII UNICODE Standard. Such mechanism is for instance used in "IPSEC Encapsulating Security Payload" and described in the document RFC 2404. IPSEC (IP SECurity) is a standard applied for achieving secure connections on networks with IP (Internet Protocol) communication protocol, and the protocol "Encapsulating Security Payload" (known with the acronym ESP) belongs to the suite of protocols IPSEC and has the objective of providing confidentiality and control of integrity and authenticity to the IPSEC communication using the described hash mechanism.

In a practical implementation of the present invention, in view of the fact that the "Challenge" CLG is a random sequence of bits, that, due to the random character, it is practically impossible to generate more than once a same sequence, that a generic random sequence of bits is preferably valid only for limited time, and of the fact that an algorithm of secure MAC like the SHA1 is used, it is possible to further reduce, for instance from 12 to 8, the number of characters that the user has to enter (these characters are highlighted in the preceding table as underlined) without substantially altering the security level of the general methodology.

It can be appreciated that the translation performed to generate the string AECLG is made on the encrypted "Challenge" ECLG, i.e. on the value resulting from the encryption operation of the binary "Challenge" CLG.

In the symmetrical implementation mode of the method according to the embodiment of the present invention here described, the graphic "Challenge" 145 generated and sent by the authentication server 105, displayed by the user terminal 115 and captured by the portable device 150, can be defined as "in clear", since the coding performed for obtaining the string B64CLG is done on the original binary sequence CLG.

For the coding/decoding of the graphic "Challenge" several technologies of representation in two dimensions (2D) can be used, for instance barcodes, particularly, although not limited to, the technologies DataMatrix, PDF417, QR-tails, Aztec Code, MaxiCode, already commercially available at low cost.

Asymmetrical Mode

Figure 3:
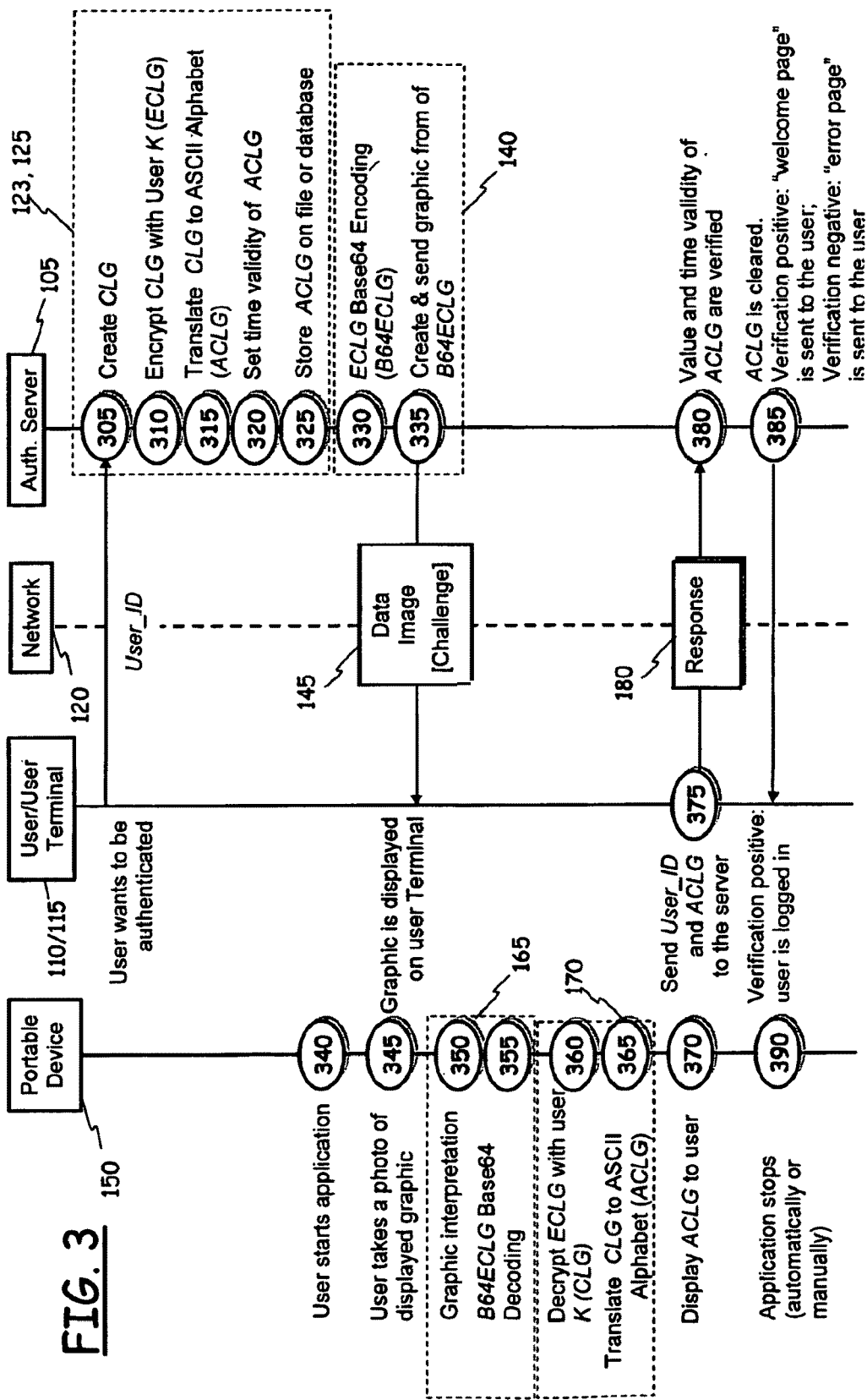
FIG. 3 schematically shows a second implementation mode of an authentication method according to an embodiment of the present invention, hereinafter also defined "asymmetrical mode"

In FIG. 3 there is schematically shown, in terms of the main operations performed by the different players and of the information exchanged among them, the asymmetrical mode of implementation of the authentication method. The asymmetrical mode differs from the symmetrical mode only in some phases of the authentication process (the same considerations made in the description of the symmetrical mode concerning the lengths of the sequences of bits, of the strings, their generation, the usable alphabet for the textual strings and so on apply).

As in the symmetrical mode, the process of authentication of the user 110 starts with an explicit authentication request submitted by the user 110 who, declaring his/her own identity to the authentication server 105, for instance using his/her own personal identification code User_ID, triggers the authentication process. Such process evolves as described herebelow.

Phase 305. As in the symmetrical mode, using a suitable generator, hardware or software, the authentication server 105 generates the "Challenge" CLG.

Phase 310. As in the symmetrical mode, the authentication server 105 then encrypts the sequence of bits making up the "Challenge" CLG thus generated with an encryption algorithm, for instance a symmetrical key algorithm, like the AES, using the encryption key K associated with the user 110 identified by the personal identification code User_ID that the user has provided to the authentication server with the authentication request. An encrypted sequence ECLG is thus obtained.

Phase 315. The authentication server 105 transforms the binary sequence CLG forming the "Challenge" into a textual string ACLG of pre-determined length (for instance 10 characters), preferably using an alphabet with characteristics similar to those described in connection with the symmetrical mode (thus, differently from the symmetrical mode, it is the random sequence CLG "in clear", not the encrypted sequence ECLG, that is transformed into the textual string ACLG).

Phase 320. Preferably, the authentication server 105 establishes a temporal term of validity of the textual string ACLG, defined as the maximum time within which the authentication server waits for the user 110 to return its answer thereto, that is the verification "Response" (also in this case, the term of validity can be for instance of some minutes, for instance 2 minutes).

Phase 325. The textual "Challenge" ACLG and the associated temporal term of validity are stored in a file (130 in FIG. 1) of the authentication server 105, waiting to be verified.

Phase 330. The encrypted binary sequence ECLG is encoded into characters, for instance in the Base64 format or other coding, as described in connection with the symmetrical mode, obtaining a string B64ECLG.

Phase 335. Similarly to the symmetrical mode (but using the textual string derived from the encrypted sequence ECLG, instead of the sequence "in clear" CLG), the string B64ECLG is used by the authentication server 105 for the generation of a suitable graphic "Challenge" 145, that is sent through the data network 120 to the terminal 115 of the user 110.

Phase 340. As in the symmetrical mode, the user 110 starts on his/her own portable device 150 a suitable application.

Phase 345. As in the symmetrical mode, through its graphic interface, the user terminal 115 displays on its screen to the user 110 an image containing the received graphic "Challenge" 145; through the portable device 150 the user 110 captures the image containing the graphic "Challenge", for instance he/she takes a photograph of the displayed image containing the graphic "Challenge". In alternative to the display on the screen of the terminal 115, a printout of the image on a paper support can be provided for.

Phase 350. The application 165 resident on the portable device 150 analyzes and extracts from the photographed image the string B64ECLG.

Phase 355. The application 165 on the portable device 150 converts the string B64ECLG into the binary encrypted sequence ECLG.

Phase 360. The processing algorithm 170 on the portable device 150 decrypts the encrypted binary sequence ECLG using the encryption key K of the user (in alternative to the key K resident on the terminal it is also possible to use as encryption key the PIN used for starting the application on the terminal 115), with an algorithm identical to that used by the authentication server 105, obtaining a binary sequence CLG.

Phase 365. The portable device 150 transforms the binary sequence CLG into a textual string ACLG, using the same methodology and alphabet used by the authentication server 105.

Phase 370. Similarly to the symmetrical mode, the string AECLG thus obtained is displayed or vocally announced by the portable device 150 to the user 110.

Phase 375. Similarly to the symmetrical mode, the user 110 communicates 105 to the authentication server his/her personal identification code User-ID and the value of the textual string ACLG.

Phase 380. Similarly to the symmetrical mode, the authentication server 105, after receiving from the user terminal 115 the string ACLG and using as a reference the personal identification code User-ID of the user 110 assesses:

whether the user identified by the personal identification code User-ID had previously requested to be authenticated;

the temporal validity of the answer from the user 110, in other words whether the answer arrived within the set time interval;

the correctness of the string ACLG received from the user 110, by comparison with the value previously stored in association with that personal identification code User-ID.

Phase 385. Similarly to the symmetrical mode, if the result of the above checks is positive, the authentication server 105 can for instance:

remove the value ACLG stored in the support 130, to prevent any subsequent attempt of reusing the same "Challenge";

send or redirect the user 110 to a "welcome page", to evidence the occurred authentication of the user 110.

In case one or more of the checks fails, the authentication server 105 can for instance:

remove the value ACLG stored in the support 130, to prevent any subsequent attempt of reusing the same "Challenge";

send or redirect the user to an "error page" that invites him/her to repeat the authentication process from the beginning.

At every attempt of authentication failed, the authentication server can increase a failures counter; at the third consecutive failure, the user 110 can be disabled by the authentication server 105; once disabled, the user 110 cannot start the authentication process anymore without preliminarily having been re-enabled.

Phase 390. The application resident on the portable device 150 can automatically terminate, lapsed a pre-determined time, for instance one minute, from having communicated to the user the value to be returned to the authentication server 105. The user 110 can also immediately terminate the application manually, possibly after having been redirected to the "welcome page."

It is pointed out that the encryption algorithm used by the authentication server 105 can be arbitrary, provided that it is congruent with that available on the portable device 150 of the user.

It is possible to appreciate that, differently from the symmetrical mode, in the asymmetrical mode the translation performed with the purpose of generating the verification element ACLG is directly performed on the value of the binary "Challenge" CLG obtained by decrypting the encrypted sequence ECLG. The graphic "Challenge" 145 generated or interpreted can be defined as sent "not in clear" or encrypted, since the encoding performed for obtaining the string B64ECLG is done on the encrypted binary sequence ECLG.

As in the case of the symmetrical mode, for the graphic coding/decoding different technologies of representation of barcode can be used which are already commercially available at low cost.

The authentication method according to the embodiments of the present invention has several advantages.

An advantage of the authentication method according to the present invention is that, for the acquisition of the authentication information sent by the authentication server, no physical contact is necessary with the user terminal 115 (there are no cables, radio connections or data exchange interfaces) for the acquisition of the authentication information sent by the authentication server: the acquisition is of the optical type, and there is no risk of compromising from the security viewpoint.

Another advantage is that on the data network 120 never transits enough information to be able to reconstruct, starting from the data possibly intercepted, the information content adapted to allow a "reverse engineering" or a "dictionary attack" with the purpose of calculating or finding the encryption key K of the user.

Still another advantage is that the purchase of ad-hoc devices is not required, but rather the simple use of a device, for instance portable, equipped with an image-capturing device, for instance a camera, like a cellular phone, a PDA, etc.; such devices are today already diffused on the market and at the reach of almost all the users.

A further advantage is that although devices can be used like cellular phones and smartphones, the coverage by a mobile telephony network is not required: it is enough to exploit the image capturing functionalities offered by such devices.

The coding of the "Challenge" can be encrypted for protecting the information against tampering during the transport on the network, or not encrypted, but protected by coding with a non-reversible HMAC algorithm.

The graphic coding of the "Challenge", in general, cannot be tampered without the complete invalidation of the transported content; this represents an intrinsic security element.

Moreover, as already mentioned, for the graphic coding various technologies of representation already available on the market at low cost can be used.

The encryption keys and the cryptography and/or MAC algorithms can be freely chosen. Such keys can be managed both by a mobile telephony operator in cooperation with the provider of the service, or directly by the latter. In other words, a generic provider of on-line services can, for the authentication of its subscribers, both rely on a specific authentication service made available by a provider of authentication services, and use a completely autonomous solution in which the authentication server is directly managed by the provider of on-line services.

As described previously, the keys of the encryption and/or MAC algorithms can be for instance distributed, at the subscription of the authentication service of, in optical mode, photographing, always with the portable device 150, suitable graphics that does not contain a "Challenge" but the encryption key of the user, or Over-The-Air (OTA), via applicable SMS messages, and they can reside on a smartcard that can be associated with the portable device 150, for instance on the SIM (Subscriber Identification Module) card of the cellular phone.

The graphic "Challenge" 145 sent to the user can contain, in addition to the information necessary for the authentication, also other types of information, like for instance the summary of a transaction, a password or a verification code or advertisement messages.

The image processing software for the extraction of the "Challenge" from the captured image can be designed for different types of cellular phone and palmtops equipped with camera (for instance based on Symbian, WindowsMobile, Java Device platforms).

In the following of the description some examples of application of the authentication method according to the present invention will be presented.

Figure 4:
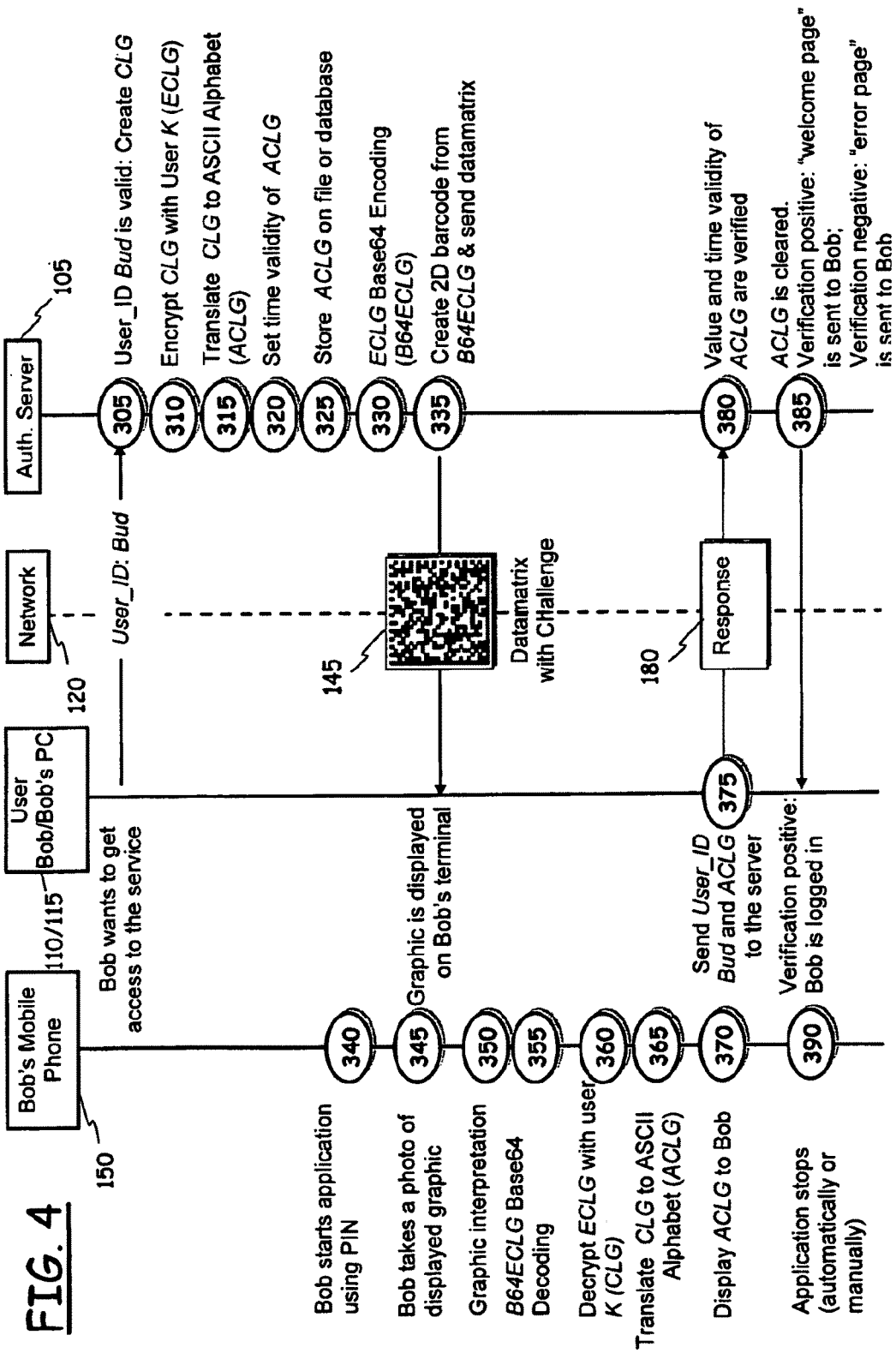
FIG. 4 schematically shows, in terms of the main operations performed by the different players and of the information exchanged among them, a possible application of the asymmetrical authentication mode, according to an embodiment of the present invention.

In FIG. 4 there is schematically shown, in terms of the main operations performed by the different players and of the information exchanged among them, a possible application of the authentication method according to an embodiment of the present invention, for the access to a Web application.

Particularly, the practical application that will now be discussed uses the asymmetrical mode described previously with reference to FIG. 3. The various phases of the authentication process are therefore those described in connection with the asymmetrical mode, to which reference is made, and will not be described again. However, nothing prevents from adopting the symmetrical mode.

The user Bob has a PIN, that never transits on the data network 120, and that can have the function both of symmetrical key for the encryption and decryption of the "Challenge" received by the authentication server 105, and of making accessible the user's encryption key K during the activation of the application on the portable device 150, for instance the cellular phone of the user Bob.

The user Bob can insert his/her PIN on the portable device 150 while he/she is in a secure location, before activating the authentication process.

The PIN can be provided to the user Bob at the subscription of the authentication service, both on a paper or electronic support, or by a third party, for instance by the mobile telephony operator of which the user Bob is a subscriber.

At the successful completion the authentication process, the user Bob can access the desired Web service.

The authentication method can be used for accessing more services, like for instance Internet banking services, access to an intranet, trading services, each of which uses a specific PIN, without the necessity of any change at the authentication server side or at the software on the cellular phone of the user Bob.

Figure 5:
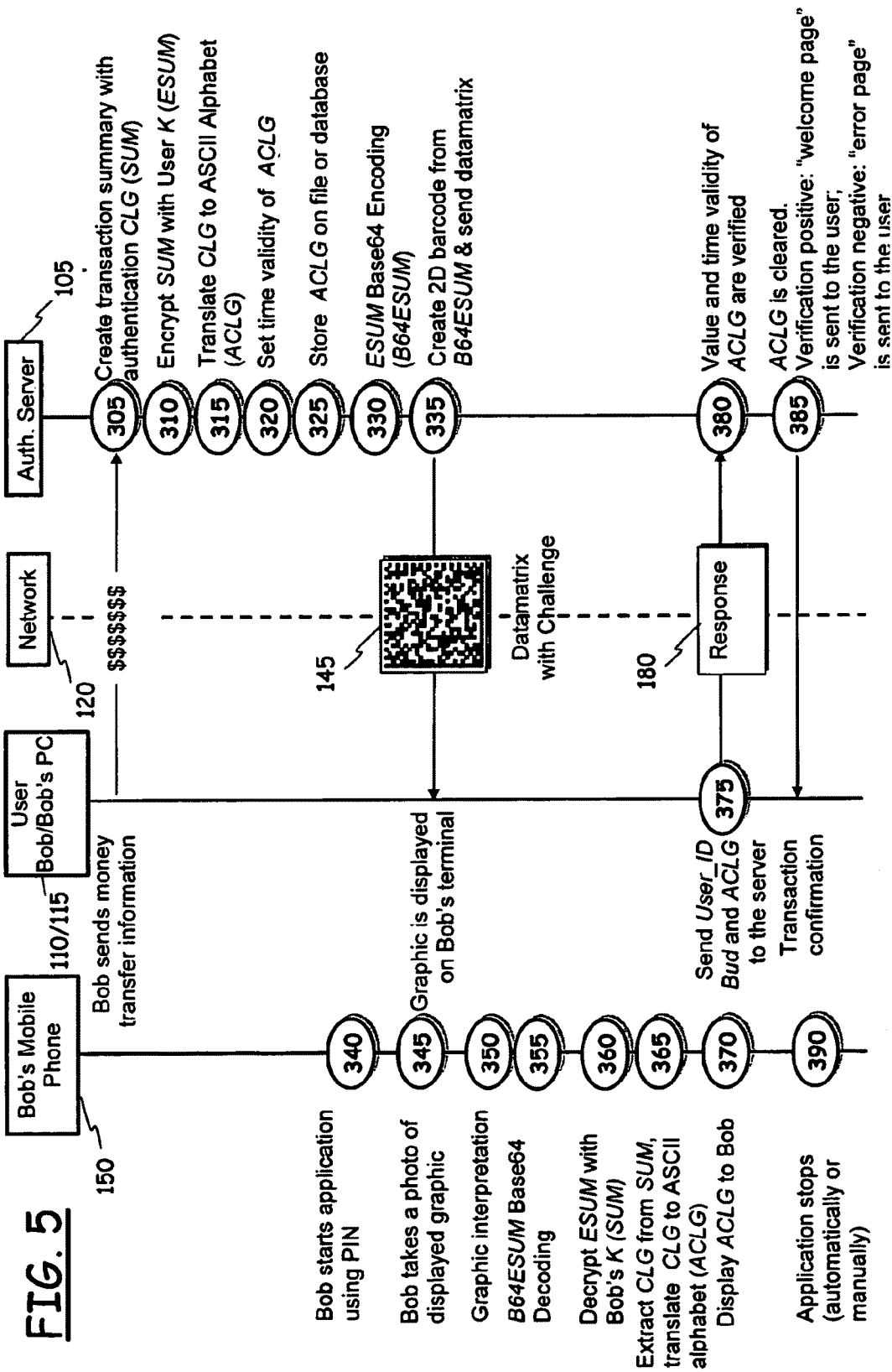
FIG. 5 schematically shows, in terms of the main operations performed by the different players and of the information exchanged among them, another possible application of the asymmetrical authentication mode, according to an embodiment of the present invention.

In FIG. 5 there is schematically shown, in terms of the main operations performed by the different players and of the information exchanged among them, a possible application of the authentication method according to an embodiment of the present invention for an "on-line" service that allows the user to impart dispositions involving the disbursement of sums of money, like for instance a bank draft, or a purchase of good or services. Particularly, in this practical application the method according to the invention is exploited for providing a countermeasure against attacks of the type "Man In The Middle" during a disposition operation.

The practical application considered in FIG. 5 uses the asymmetrical mode described in precedence. The various phases of the authentication process are therefore those described in connection with the asymmetrical mode, to which reference is made, and they will not be described again. However, nothing prevents from adopting the symmetrical mode.

In phase 305, the authentication server 105, for instance of the bank of the user Bob, generates a summary SUM of the transaction (e.g. involving a bank draft), and such summary SUM contains the "Challenge" CLG (random sequence of bits) to be used for the authentication/verify of the authenticity of the imparted disposition. The summary of the transaction SUM is encrypted by the authentication server 105 using the encryption key K of Bob, the encrypted summary ESUM is encoded transforming it into a textual string B64ESUM and the string B64ESUM is transformed into graphic form (bidimensional barcode) and sent to the terminal (for instance a Personal Computer) of Bob. In the phase 365, the application on the cellular phone 150 of Bob extracts the "Challenge" CLG from the summary, and in the phase 370, through the cellular phone, the summary SUM of the transaction and the "Challenge" CLG are presented to Bob.

An attacker capable of interposing between the user Bob and the authentication server 105 of the bank of the user Bob could be able to alter the information that the user Bob sends to the authentication server 105; nevertheless, thanks to the fact that the information contained in the "Challenge" are sent to the user Bob together with the summary of the transaction, it is possible to guarantee an increased security level.

The attacker, even if able to alter the information sent by the user, is nevertheless not in condition of altering the synthetic information of the transaction contained in the graphic "Challenge" sent by, the authentication server to the user, because this is encrypted.

The user can immediately realize if the information received by the authentication server 105 differs from that he/she has entered (for instance, in the case of a bank draft, a different beneficiary, and/or a different amount of money), and therefore he/she can deny the transaction confirmation, sending a wrong or agreed verification code, for instance the digits "0000000."

In order to confirm the transaction, the user has to re-send to the authentication server 105 the "Response" generated starting from the received "Challenge"; in this way, the confirmation of the transaction is protected by a univocal verification code. This strategy allows avoiding the re-use thereof by an attacker who can monitor a certain number of transactions that the user successfully concluded sending the correct verification code.

It is also possible that, before being able to proceed to sending to the authentication server a disposition, the user has to authenticate him/her at the server of his/her bank, using one of the methodologies described in the foregoing.

Figure 6:
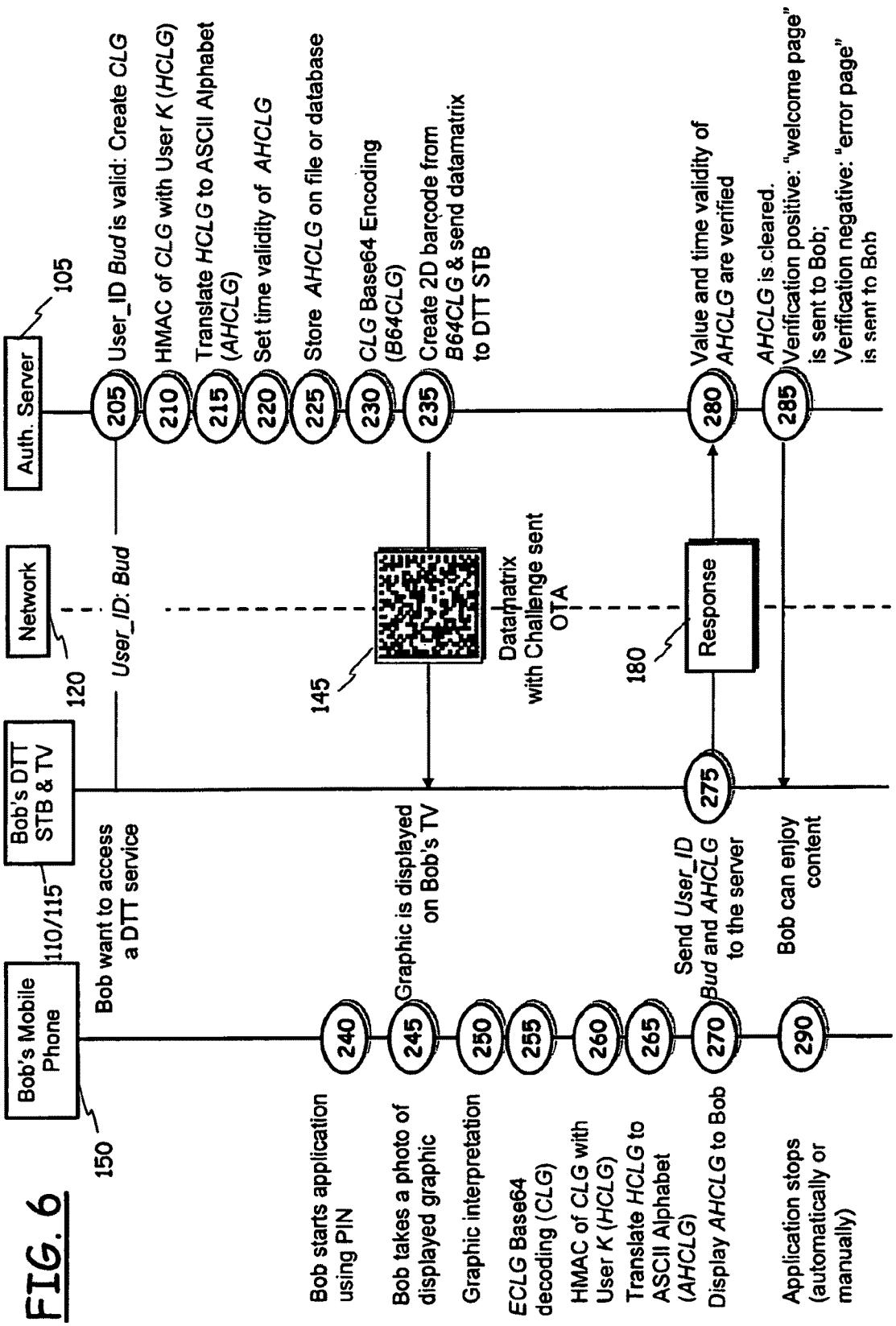
FIG. 6 schematically shows, in terms of the main operations performed by the different players and of the information exchanged among them, a possible application of the symmetrical authentication mode, according to an embodiment of the present invention.

In FIG. 6 there is schematically shown, in terms of the main operations performed by the various players and of the information exchanged among them, a possible application of the authentication method according to an embodiment of the present invention in the context of the distribution of multimedia contents, particularly digital television through air or cable, for instance on telephone network (IPTV).

This application of the authentication method according to the invention is directed to provide a solution capable of increasing the security level in connection with the access and/or the transactions performed using new services (electronic mail, box-office, surveys, electronic poll, video on-demand, etc.) offered by DTT and IPTV platforms. Such platforms are constituted by a user interface, normally represented by a television set, an apparatus installed at home of the user called "Set Top Box" (STB) or decoder by which it is possible to receive the digital signal (over the air in the DTT case, over a data line in the case Cable TV or by broadband connection for IPTV) to which a telephone line called "return channel" is connected that, through traditional (V.90) or ISDN modem or through broadband (ADSL) modem, allows the interaction of the user with a service center.

In this application, the symmetrical mode previously described is exploited, to which reference is made for the detailed description of the various phases, and it is assumed to use as verification algorithm the HMAC instead of the encryption. However, nothing prevents from using the asymmetrical mode.

The characteristics and the security level of the proposed solution are analogous to those of the application related to the access to a Web application, because on the STB of the user the standard MHP (Multimedia Home Platform) allows the implementation of interactive applications with graphic content as allowed by the HTML and JAVA for the World Wide Web.

Figure 7:
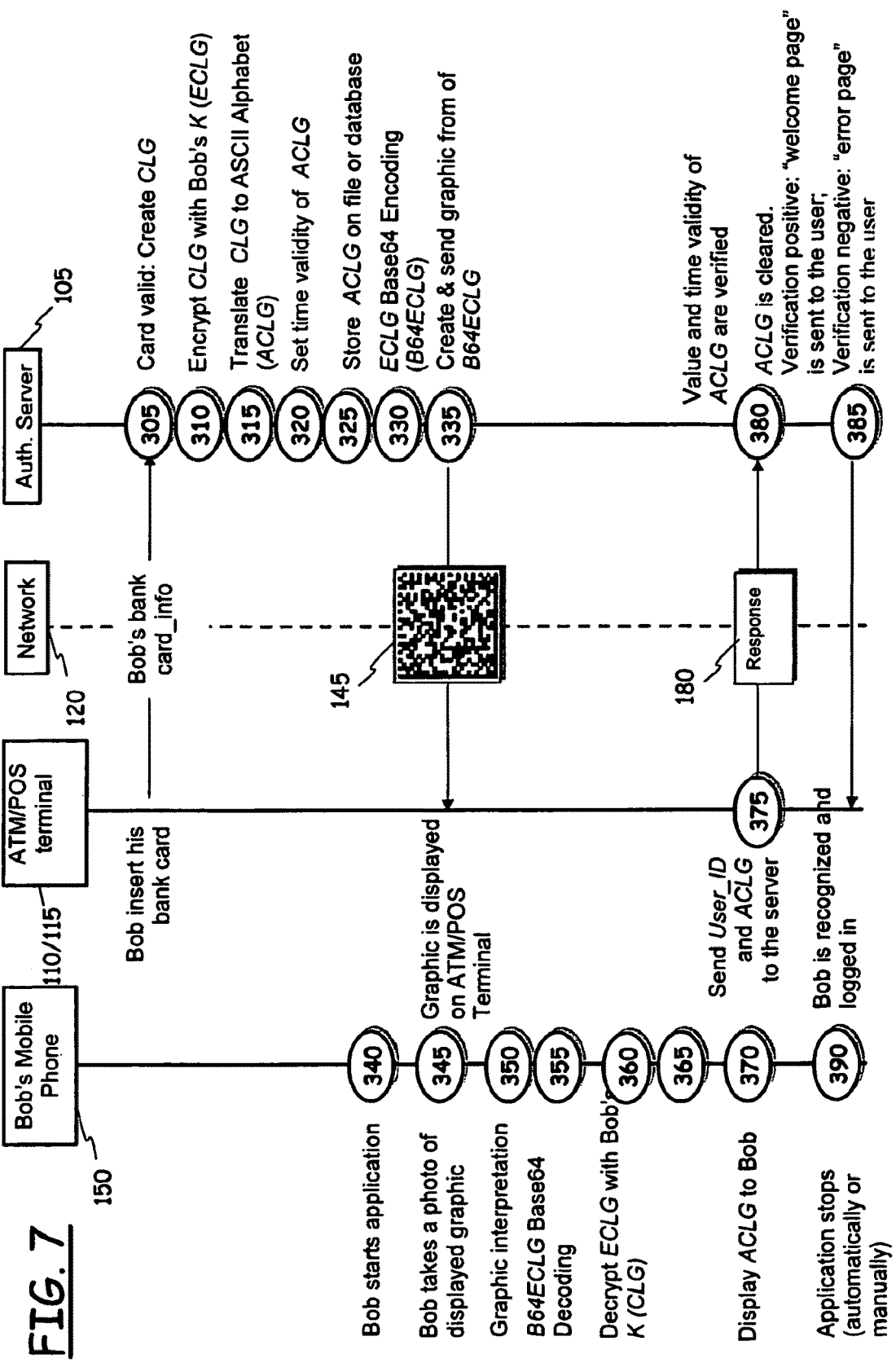
FIG. 7 schematically show, in terms of the main operations performed by the different players and of the information exchanged among them, still another possible application of the asymmetrical authentication mode, according to an embodiment of the present invention.

In FIG. 7 there is schematically shown, in terms of the main operations performed by the various players and of the information exchanged among them, a possible application of the authentication method according to an embodiment of the present invention to Automatic Teller Machines (ATMs). Particularly, the example of FIG. 7 relates to the asymmetrical mode previously described.

ATMs are normally installed both near financial institutes (bank offices, for instance), and in malls, and they allow collecting cash or perform other low-level operations, like inspecting the balance or the bank statement of account. The ATMs represent, for the financial institutes, a tool that substantially affects the "customer experience" of their customers. However, bank cards to be used in ATMs are often lost or fraudulently subtracted, and this constitutes a problem under the profile of the security of the system, that contributes to significantly increase the risks of fraud.

The problems related to the use of bank cards in ATM terminals are several.

The PIN that is requested to the user after having introduced the bank card into the ATM or POS (Point Of Sale) terminal, even if short, has to be remembered and kept secret by the user, who however often, to facilitate his/her duty, writes it down on paper, or hides it within a telephone number in an address book, and in some cases the user communicates the PIN to third parties (this is for instance the case of elder persons who communicate the PIN to relatives, assistants or the like, whom they think to be trusted persons).

The PIN must manually be introduced by the user on the POS or ATM terminal, and can thus be seen by indiscreet eyes or by means of microcameras.

The bank card stores the PIN internally, and the PIN, even if encrypted, could be subject to "brute force" attacks, for instance through a program that forces the opening of a compressed (ZIP) file using all the possible combinations for the password, until the matching one is found.

The loss of the bank card is an event that involves a problem for the user and, for the entity that issued it, a series of onerous activities with the purpose to block its usage.

The types of frauds inherent to this service are the cloning of the card using the "skimmer" technique (duplication of the data contained in the card and simultaneous capture of the secret code entered by the user), and the capture of the card directly at the terminal (for instance through the "crocodile" technique, or by sequestration of the card owner or by pick-pocketing).

The authentication method according to an embodiment of the present invention can be used in this context, particularly also on POS terminals with colour or monochrome graphic terminal.

Since in this implementation mode the user conventionally has to enter a sequence of numbers on the keyboard of the ATM, the dictionary that is used to translate the random sequence of bits that constitutes the original "Challenge" into a string can exclusively use a numerical alphabet, instead of alphanumeric.

According to this possible application of the method according to the invention, the user does not know a "valid code" to be entered on the keyboard of the ATM or POS terminal, and does not need to remember it, because such code will be provided thereto at the proper time by his/her portable device, for instance his/her cellular phone.

The PIN used for activating the application on the user's portable device the (that could be the same PIN that nowadays has to be entered on the keyboard of the ATM or POS terminal) can be entered before the operation, and in a secure place (for instance in the car or away from the ATM or POS terminal).

The string of numbers that the user enters on the keyboard of the ATM or POS terminal is valid for one operation or access to the service only, and cannot be re-used, making therefore its capture useless.

ATM cards no longer stores the PIN of the user, and therefore its duplication, loss or captures is not critical for the user.

The theft or the loss of the user's portable device does not jeopardize the security of the system, because for activating and using the resident application a code needs to be entered (for instance the PIN).

Another possible application of the authentication method according to an embodiment of the present invention is related to electronic messaging services (e-mail).

Particularly, the here considered application is intended to provide a solution capable of increasing the security level of electronic mail services with the purpose of limiting the "phishing" phenomenon.

The "phishing" is a diffused computer fraud that involves the reception by the user of an electronic mail message, apparently coming from his/her bank or from an on-line commerce company, that invites the user to connect, through an HTML (Hyper Text Markup Language) connection ("hyperlink"), to a web page managed by the "phisher" and apparently entirely "similar" to the original of the real firm. Subsequently, inside the imitated web page the user is requested to enter sensitive information (password, credit card number, etc.) to be able to access the functionalities required in the electronic mail message (for instance, the change of personal information, the provision of the consent to the treatment of the information, the deletion of a financial operation erroneously assigned to the user, etc.). The information provided by the user is captured (stolen) from the "phisher" who will use it to perform, in the name of the user, undue purchases or fraudulent transactions.

Normally the electronic mail messages, also those sent by banks and financial institutes, are not protected, because the electronic mail is often simply thought to be a communication, and also the users are accustomed to consider it like this. Often, the protection is only related to the access to companies' Web sites, for which the user has to insert his/her credential whose validity is verified only at the access time. The user does not have a direct possibility of verifying the validity of the sender and the content of the electronic mail message, and he/she does not even have the possibility of verifying the validity of the accessed web page.

The problem therefore exists of protecting the content of electronic mail messages with a simple and effective system. The electronic mail message can be protected using the strategy described by way of example hereinafter.

According to an embodiment of the present invention, hypertext links usable by the user are not directly included within the text of an electronic mail message.

All the confidential and sensitive information are put inside a document attached to the electronic mail message, having a format such as to be modifiable only by those who created it (for instance, the attached document can be a file in PDF—Portable Document Format—format, protected against changes) and whose readability is protected by a password. In the attachment to the electronic mail message it is possible to insert, in addition to the confidential information, also links that allow the user to reach a Web site like the portal of a bank.

The electronic mail message contains the authentication information in graphic form (i.e., the graphic "Challenge") generated by the authentication server at the time of creation of the electronic mail message.

To increase the security level, the graphic authentication "Challenge" can contain additional information related to the attachment, like for instance a verification code, random parts of the message, date and time of issue, the answer to a "secret question" that the user has defined at the subscription of the service.

Figure 8A:
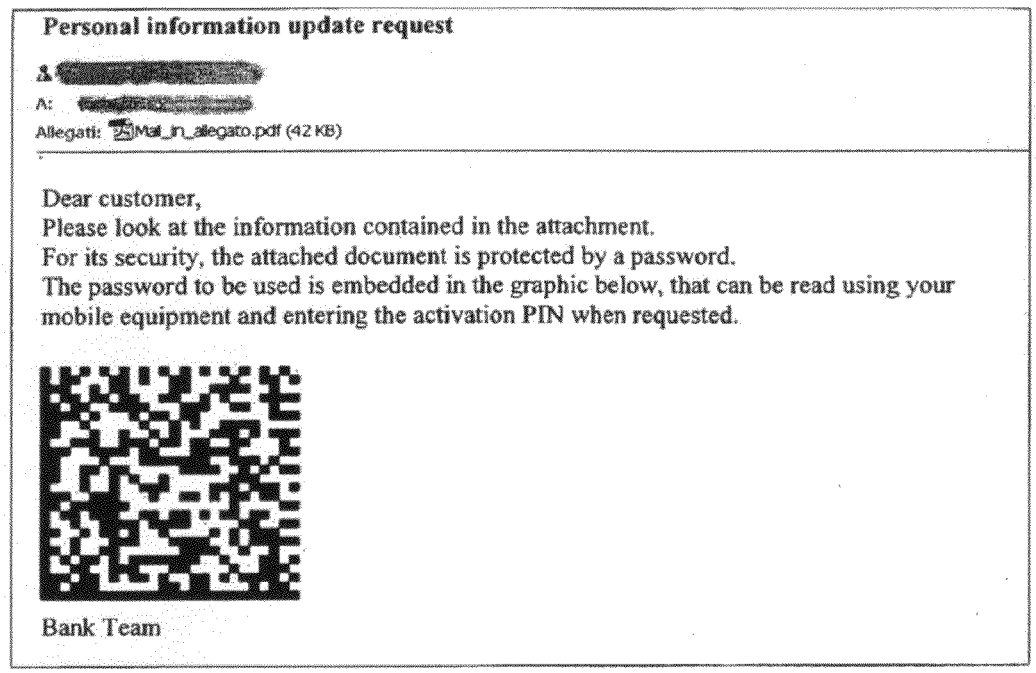
FIG. 8A shows a possible aspect of an electronic mail message received by the user, in a further possible application of the authentication method according to an embodiment of the present invention.
Figure 8B:
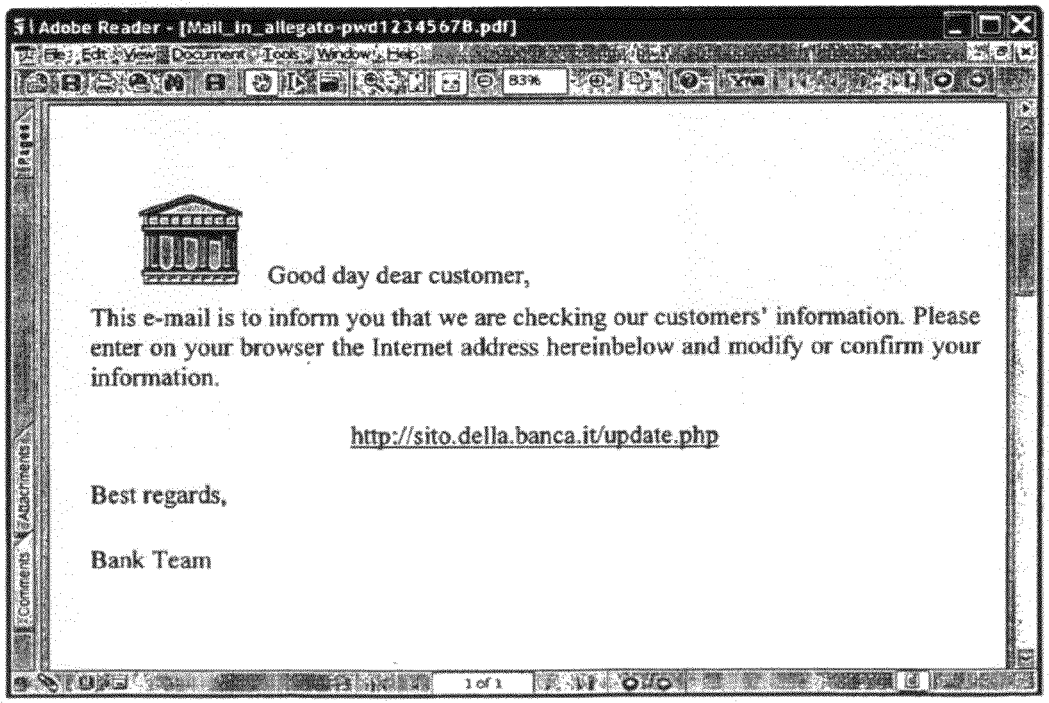
FIG. 8B shows a possible aspect of an attachment to the electronic mail message of FIG. 8A, in PDF format, containing confidential information and a link to an Internet site through which on-line services are offered.

FIG. 8A shows the possible aspect of an electronic mail message received by the user. FIG. 8B shows instead the possible aspect of an attachment to the electronic mail message, for instance in PDF format, containing the confidential information and a link to the site of the bank.

FIG. 9 schematizes a process of local verification of the authenticity of the electronic mail message.

The user receives from the sender 905 the electronic mail message 910, and displays it on his/her terminal (for instance, PC) 115, then the user activates the application on his/her portable device 150 (for instance the cellular phone), preferably using a PIN; then the user takes a photograph, with the camera 155 of the cellular phone 150, of the image displayed on the screen of the PC 115 and reads the string displayed by the cellular phone 150 (derived by processing of the graphic "Challenge", as described in the foregoing), or he/she listens to its vocal declamation at the loudspeaker of the cellular phone.

The user then requests to open the attachment 915 to the electronic mail message 910, and the request of insertion of a password 920 is presented to the user; the user inserts the password previously read on or listened from the cellular phone 150, so that a resident application on the PC 115 can display the content of the attachment 915. In this way, entering the correct password, the user is authenticated, and, as a result of the occurred authentication, he/she can access the informative content of the attachment.

Inside the attachment 915 the insertion of one or more links 925 that allow the user to safely reach the correct Web site is possible.

With the purpose of increasing the general security level of the methodology, the Web site reached by the user through the link present in the attached document 915 could use in turn an authentication mechanism based on a graphic "Challenge" and a "Response" from the user, as described in the foregoing. In this case, inside the attachment 915 a further graphic "Challenge" 930 will be present, from which the user can derive the credentials for accessing the service (password/PIN/ID or UserID and password/PIN).

In this way, all the sensitive information are contained in the file attached to the electronic mail message, and they are protected by an encrypted OTP (One Time Password) represented in graphic form and contained in the electronic mail message. The message and the attachment can be duplicated, but only for the user to which it is addressed, making therefore useless their re-use because the attachment is not readable by other users.

The process allows the user to immediately realize if anything is suspicious, as for instance the lack of the graphic "Challenge" or the impossibility to read it or an enclosure that does not require the password or in which the password does not work.

The graphic "Challenge" cannot be imitated, because for its generation, or to derive therefrom the password that the user has to enter for opening the attachment, it is necessary to know the encryption key, shared only between the portable device of the user and the entity that sends the electronic mail message.

This methodology also allows electronic mail messages on public terminals and electronic mail services to be read, since the portable device of the user is the only device capable of decoding the graphics and derive the codes for reading the enclosure.

Another possible application of the present invention in the e-mail services consists in the possibility that an e-mail message is sent to the user containing a graphic "Challenge", from which the user can derive, in the described way, a "Response" to be used as an access code to a Web site from which to get from the message sender a confirmation of the authenticity of the received e-mail message. The address (URL) of the Web site to which to connect can be contained in the same graphic "Challenge" and shown to the user by his/her portable device.

The use of the PDF format for the attachment allows making its content unmodifiable.

Moreover, no radio connectivity is required for the verification of the electronic mail message.

The present invention has been described here presenting some possible embodiments; nevertheless, those skilled in the art can make several changes to the embodiments described, or devise alternative embodiments, without departing from the scope of protection of the invention defined in the appended claims.

For instance, the Base64-format coding might not be foreseen, for instance in the case in which the graphics used for encoding the "Challenge" supports the transfer of the information in binary form, that is the coding from hexadecimal to ASCII is made directly by the image processing algorithm 140 when generating the bidimensional barcode.

The invention claimed is:

1. A method of authentication of users in a data processing system, the method comprising:
generating a challenge univocally associated with a user to be authenticated;
processing the challenge to generate an expected answer code to be compared to an answer code that the user provides for authentication;
encoding the generated challenge to obtain an image displayable on a display device;
sending the image containing the challenge to the user;
displaying the image containing the challenge on the display device;
capturing, by a user device having an image-capturing device, an image of the displayed image containing the challenge;
processing, by the user device, the captured image for extracting the challenge from the captured image, and subsequently processing the extracted challenge for generating the answer code;
receiving the answer code from the user and comparing the answer code to the expected answer code; and
in case of positive comparison, authenticating the user,
wherein one among said actions of generating the challenge and the expected answer code and said action of processing the captured image to generate said answer code exploit secret information univocally associated with the user.

2. The method of claim 1, wherein said generating the expected answer code includes associating a time validity limit with the expected answer code, and said receiving the answer code from the user and comparing the answer code with the expected answer code includes assessing if the answer code from the user is received within said time validity limit.

3. The method of claim 1, wherein said generating the challenge comprises generating a substantially random sequence of bits.

4. The method of claim 3, wherein said generating the challenge comprises encoding the substantially random sequence of bits into a first string of alphanumeric characters that univocally represents the challenge.

5. The method of claim 4, wherein said encoding the challenge comprises encoding the first string of alphanumeric characters, and encoding the encoded first string of alphanumeric characters to obtain the image displayable by the display device.

6. The method of claim 5, wherein said generating the expected answer code includes encrypting the substantially random sequence of bits with said secret information or calculating a hash of the substantially random sequence of bits with said secret information.

7. The method of claim 6, wherein said generating the expected answer code includes encoding the encrypted substantially random sequence of bits or the hash of the substantially random sequence of bits to obtain a second string of alphanumeric characters and storing the obtained second string.

8. The method of claim 7, wherein said processing the captured image for extracting the challenge from the captured image and generating the answer code includes:
decoding the first string of alphanumeric characters to obtain the substantially random sequence of bits;
encrypting the substantially random sequence of bits with said secret information to obtain a further encrypted substantially random sequence of bits, or calculating a hash of the substantially random sequence of bits with said secret information; and
encoding the further encrypted substantially random sequence of bits or the hash of the substantially sequence random of bits to obtain the second string of alphanumeric characters, said second string of alphanumeric characters constituting the answer code.

9. The method of claim 3, wherein said generating the challenge comprises encrypting the substantially random sequence of bits with said secret information.

10. The method of claim 9, wherein said generating the challenge comprises encoding the encrypted substantially random sequence of bits into a first string of alphanumeric characters, and encoding the first string of alphanumeric characters to obtain the image displayable by the display device.

11. The method of claim 10, wherein said generating the expected answer code includes encoding the substantially random sequence of bits into a second string of alphanumeric characters and storing the obtained second string.

12. The method of claim 11, wherein said processing the captured image for extracting the challenge from the captured image and generating the answer code includes:
decoding the first string of alphanumeric characters to obtain the encrypted substantially random sequence of bits;
decrypting the encrypted substantially random sequence of bits with said secret information to obtain the substantially random sequence of bits; and
encoding the substantially random sequence of bits to obtain the second string of alphanumeric characters, said second string of alphanumeric characters constituting the answer code.

13. The method of claim 1, wherein said encoding the generated challenge to obtain the image comprises generating a bidimensional barcode.

14. The method of claim 1, wherein said authenticating the user includes enabling the user to access, through a user data processing terminal connected to a data network, a service made available by a server connected to said network.

15. The method of claim 1, wherein said encoding the generated challenge to obtain the image comprises including summary information in the image, the summary information adapted to identify a transaction performed by the user.

16. The method of claim 1, wherein said sending the image containing the challenge to the user comprises including the image in an electronic mail message, and sending the electronic mail message to the user.

17. The method of claim 16, wherein said authenticating the user includes allowing the user to display an electronic document attached to the electronic mail message.

18. A system for the authentication of users in a data processing system, the authentication system comprising:
  a) an authentication server, said authentication server adapted to:
    generate a challenge univocally associated with a user to be authenticated;
    process the challenge to generate an expected answer code, to be compared to an answer code that the user provides for authentication;
    encode the generated challenge to obtain an image;
    send the image containing the challenge to a data processing terminal of the user through a data network;
    wherein the user data processing terminal comprises a display device adapted to display the image containing the challenge;
  b) a user device provided with an image-capturing device adapted to capture an image of the displayed image containing the challenge, the user device adapted to process the captured image for extracting the challenge from the captured image and to process the challenge to generate an answer code to be compared to the expected answer code for authenticating the user,
  wherein one among said actions of generating the challenge and generating the expected answer code, and said action of processing the captured image to generate the answer code exploits secret information univocally associated with the user.

19. A non-transitory computer-readable media storing computer-readable instructions that, when executed by a computing device, cause the computing device to:
  capture an image of an image displayed on a display device, wherein the displayed image is an encoded challenge univocally associated with a user to be authenticated, wherein the encoded challenge has a corresponding expected answer code used for authentication;
  process the captured image for extracting the challenge from the captured image;
  process the extracted challenge to generate an answer code; and
  display the answer code on a display unit of the computing device, wherein the answer code is to be compared to the expected answer code for authenticating the user.

* * * * *

UNITED STATES PATENT AND TRADEMARK OFFICE
CERTIFICATE OF CORRECTION

PATENT NO.        : 8,407,463 B2
APPLICATION NO.   : 12/740966
DATED             : March 26, 2013
INVENTOR(S)       : Maurizio Ghirardi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this
First Day of September, 2015

Michelle K. Lee
*Director of the United States Patent and Trademark Office*